United States Patent [19]

Buchanan et al.

[11] Patent Number: 4,591,469
[45] Date of Patent: May 27, 1986

[54] PROCESS FOR MAKING FOAM-IN-FORM POLYURETHANE FOAM BUNS AND APPARATUS THEREFOR

[75] Inventors: Michael S. Buchanan, Baltimore; Gregory B. Davis, Monkton, both of Md.

[73] Assignee: Wm. T. Burnett & Co., Inc., Baltimore, Md.

[21] Appl. No.: 696,523

[22] Filed: Jan. 30, 1985

[51] Int. Cl.$^4$ .............................................. B29C 67/20
[52] U.S. Cl. ................................ 264/45.3; 264/45.7; 264/109; 264/DIG. 7; 425/435
[58] Field of Search .............. 249/137; 264/45.3, 45.4, 264/45.7, 71, 109, 310, DIG. 7, DIG. 13; 425/435

[56] References Cited

U.S. PATENT DOCUMENTS

4,438,220  3/1984  Fracalossi et al. .................... 521/55
4,438,221  3/1984  Fracalossi et al. .................... 521/55

Primary Examiner—Donald Czaja
Assistant Examiner—V. Fischbach
Attorney, Agent, or Firm—A. W. Breiner

[57] ABSTRACT

An improved method for manufacturing a foam-filled polyurethane foam bun from foam particles having uniformly dispersed therewith large amounts of solid material bonded together with new polyurethane foam is described. The method comprises uniformly applying a liquid flexible polyurethane foam-forming material to a dispersion of foam particles and solid material to provide a blend, distributing the blend within a mold, and foaming and curing the foam-forming material by a plurality of steaming steps wherein the mold is flipped from a first to second position between steaming steps. The foam buns have a uniform density gradient. Foam buns are disclosed having a variation in density across the foam bun. There is also disclosed an improved char-forming foam obtained as a result of using boric acid in the foam-forming formulation.

15 Claims, 12 Drawing Figures

PROCESS FOR MAKING FOAM-IN-FORM POLYURETHANE FOAM BUNS AND APPARATUS THEREFOR

FIELD OF INVENTION AND BACKGROUND

The present invention relates to polyurethane foam. More particularly the invention relates to a process of producing foam-in-foam polyurethane foam buns and to articles of manufacture produced from such foam-in-foam polyurethane foam buns. According to the present invention, pre-existing shredded and/or ground polyurethane foam particles are bonded together with new polyurethane foam in an improved process to make polyurethane foam buns.

Rebonded polyurethane foam has been made in the prior art by shredding and/or grinding waste polyurethane foam to form polyurethane foam particles, mixing the polyurethane foam particles with a binder, and then curing the binder either at atmospheric pressure, or under reduced pressure, with or without added heat energy, for effecting cure of the binder. The resultant foams have normally had relatively high and nonuniform densities and, because of the appearance of the product, have been used primarily where the foam is not readily seen as, for example, as carpet underlay and the like. When fabricating rebonded foam it was possible to incorporate only relatively low amounts of liquid and solid materials into the foam to modify the foam structure, including the addition of only low amounts of combustion retardant materials to render the resultant foam combustion retardant. If larger amounts of solid and liquid materials were added, the resultant foam would have poor physical characteristics. Accordingly, such rebonded foam could not be used where flame or combustion retardant materials were required.

More recently it has been discovered that shredded and/or finely ground polyurethane foam could be used in making polyurethane foam buns or slabs having relatively high amounts of solid materials by foaming particles of existing polyurethane foam and solid particles of an additive, including fire retardant materials, with new polyurethane foams. Thus, U.S. Pat. No. 4,438,221 describes the preparation of foam-filled foam structures obtained through the steps of admixing particles of flexible polyurethane foam with a solid material, uniformly applying to the mixture a liquid, flexible polyurethane foam-forming material containing a reactive polyol and a polyisocyanate, and foaming the foam-forming material with water to provide a flexible foam having bonded therein the polyurethane foam particles and solid material. According to the teaching of the U.S. Pat. No. 4,438,221, it was possible to incorporate relatively large amounts of solid materials into the polyurethane foam particles while maintaining the integrity and good physical properties of the foam structures. U.S. Pat. No. 4,438,220 also describes foam-filled polyurethane foam structures of the type described in the U.S. Pat. No. 4,438,221. In the U.S. Pat. No. 4,438,220 the solid materials which are incorporated are specifically combustion retardant materials to provide polyurethane foam structures having enhanced combustion retardant characteristics. Each of the aforesaid patents, i.e., U.S. Pat. Nos. 4,438,220 and 4,438,221, is assigned to Wm. T. Burnett & Co., Inc., the assignee of the present application.

Although the aforesaid patents describe new compositions of matter and methods of making foams which are highly meritorious, an improved method of making foam-in-foam buns or slabs having a high solids content, and controlled density is still desired. The density control is particularly difficult when using high amounts of solid materials in the foam formulation.

OBJECTS AND GENERAL DESCRIPTION OF INVENTION

Accordingly, it is a primary object of the present invention to provide an improved method of making a bun or slab of foam-filled polyurethane foam having controlled density.

It is another primary object of the present invention to provide an improved method of controlling and varying the density across a foam-filled polyurethane foam bun or slab.

It is another primary object of the present invention to provide an improved plant system for making foam-filled polyurethane foam structures.

It is another primary object of the present invention to provide an improved steam-activated mold for use in a plant system for producing foam-filled polyurethane foam.

It is another primary object of the present invention to provide an improved apparatus for uniformly depositing solid materials into a blend of existing particulate foam while the particulate foam is being blended with a polyurethane foam-forming formulation for forming the foam-filled polyurethane foam.

According to the present invention, a plant system is provided comprising a shredder and/or grinder for making particulate foam particles from existing polyurethane foam, a particulate foam receiving storage bin and dispenser which may include a weighing mechanism, a blender for blending the particulate polyurethane foam particles with a new foam-forming formulation, and a mold for curing the blended new foam formulation and particulate polyurethane foam particles which make up the final foam-filled foam bun or slab.

In operation, waste foam is shredded and/or ground to form a substantially uniform particulate foam feed stock. The foam particles are preferably fed into a storage area. From the storage area the foam particles are weighed and thereafter fed to a blender. In the blender, the foam particles are mixed with solid particulate materials; and thereafter the mixture of foam particles and solid materials is sprayed with a polyurethane foam-forming formulation. The polyurethane foam-forming formulation can include liquid additives such as flame retardants, plasticizers and the like, as well as some solids. The uniform mixture of particulate polyurethane foam particles, solid materials and, if desired, liquid additives uniformly blended with the polyurethane foam-forming formulation are dispensed into a mold for curing. The particulate mixture is distributed in the mold, and thereafter subjected to a curing operation. A critical feature of the curing operation is that during the curing process the mold is periodically flipped top to bottom or bottom to top, and in the alternative positions subjected to steam curing. The flipping operation provides uniform curing and a product having a controlled density gradient from top to bottom. A unique feature according to the curing process of the present invention is the ability to vary the density across the foam bun or slab. Thus, by increasing the amount of the blend of foam-forming materials within the mold in a particular location it is possible to increase the density and, thus, vary the hardness of the resultant bun at that part of the bun. If it is desired to have a foam slab or bun having a high density and thus greater hardness at the edges, all that is necessary is to rake out within the mold the particulate foam particles so that the particles are higher in the area of the edges. The resultant product will provide a foam having a greater strength and hardness (density) at the edges. Similarly, if it is desired to have an increased hardness in the middle of the foam slab relative to the edges, the depth of the foam particles in the center can be increased.

After obtaining the desired distribution of foam particles within the mold, as above stated, the mold is subjected to steam curing in a first position for a short period of time. The steaming is discontinued, the mold then flipped, and steaming again commenced. The flipping and steaming operation can be repeated as necessary to provide a foam having the desired controlled density gradient. The density of the foam can be varied from a low of about 1.5 pounds per cubic foot up to about 8 pounds per cubic foot.

Figure 1:
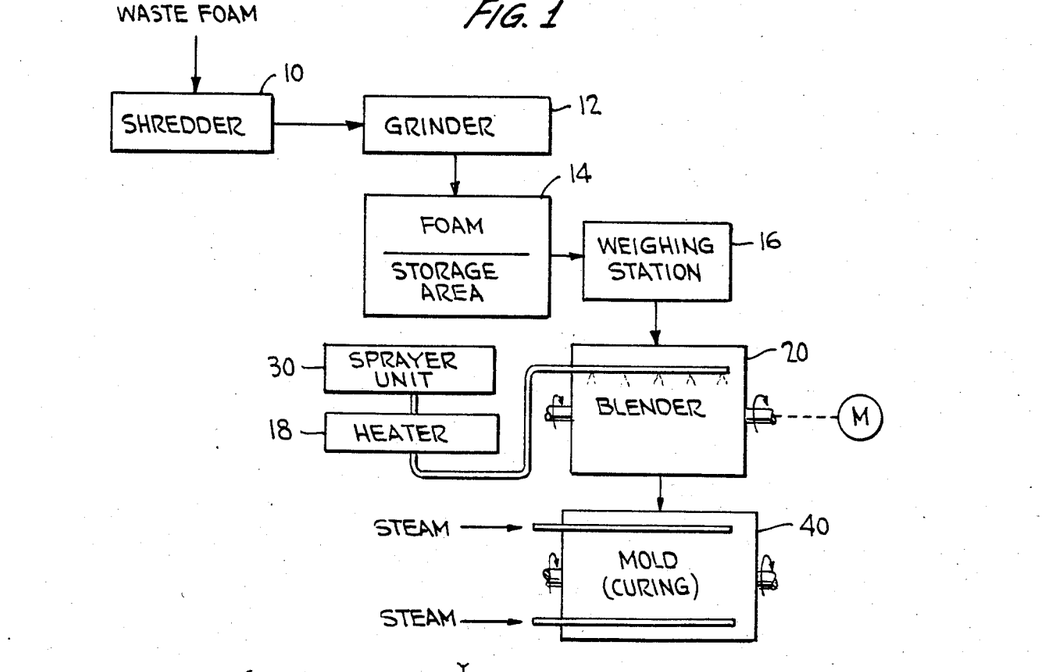
FIG. 1 is a flow diagram of the presently disclosed process.

Referring to FIG. 1 of the drawing, polyurethane foam is fed to a shredder 10 and grinder 12 to provide a particulate foam having a substantially uniform particle size. The particulate foam is fed to a foam storage area 14 which may include integral therewith or separated therefrom a weighing station 16. A weighed amount of foam is fed from the weighing station into a blender 20. While the foam particles are being rotated within the blender, solid materials such as combustion retardant materials and, if desired, liquid additives including combustion retardant additives are added to the blender. With continuous rotation and blending within blender 20, a flexible polyurethane foam-forming formulation, referred to at times as a pre-polymer mix, is uniformly sprayed onto the particulate foam from sprayer unit 30. Preferably the pre-polymer mix is heated prior to being sprayed onto the foam particles through heater means 18. As stated previously, the polyurethane foam-forming formulation pre-polymer mix can include liquid additives such as flame retardants, plasticizers and the like, as well as some solids if desired. A unique characteristic of the foam-filled foams and the method of the present invention is the ability to incorporate large amounts of solid materials into the foam structure while maintaining the structural integrity of the resultant foam bun.

The blended mixture is dispensed from the blender into a mold 40. The mixture is distributed within the mold to provide a resultant bun having the characteristics desired. Thus, if it is desired to obtain a foam bun having an increased hardness (a higher density) at the edges of the foam bun, a larger amount of foam particles will be distributed along the edges of the mold. Conversely, if a foam bun having soft edges is desired, the amount of foam at the edges of the mold will be decreased. In accordance with the distribution of the particulate mixture within the mold, a foam bun can be produced having varying density characteristics, and thus hardness, across the bun as is desired. After the blend of foam-forming materials is distributed within the mold, the mold is closed; and thereafter the mold is subjected to a curing operation.

Figures 9, 10, 12:
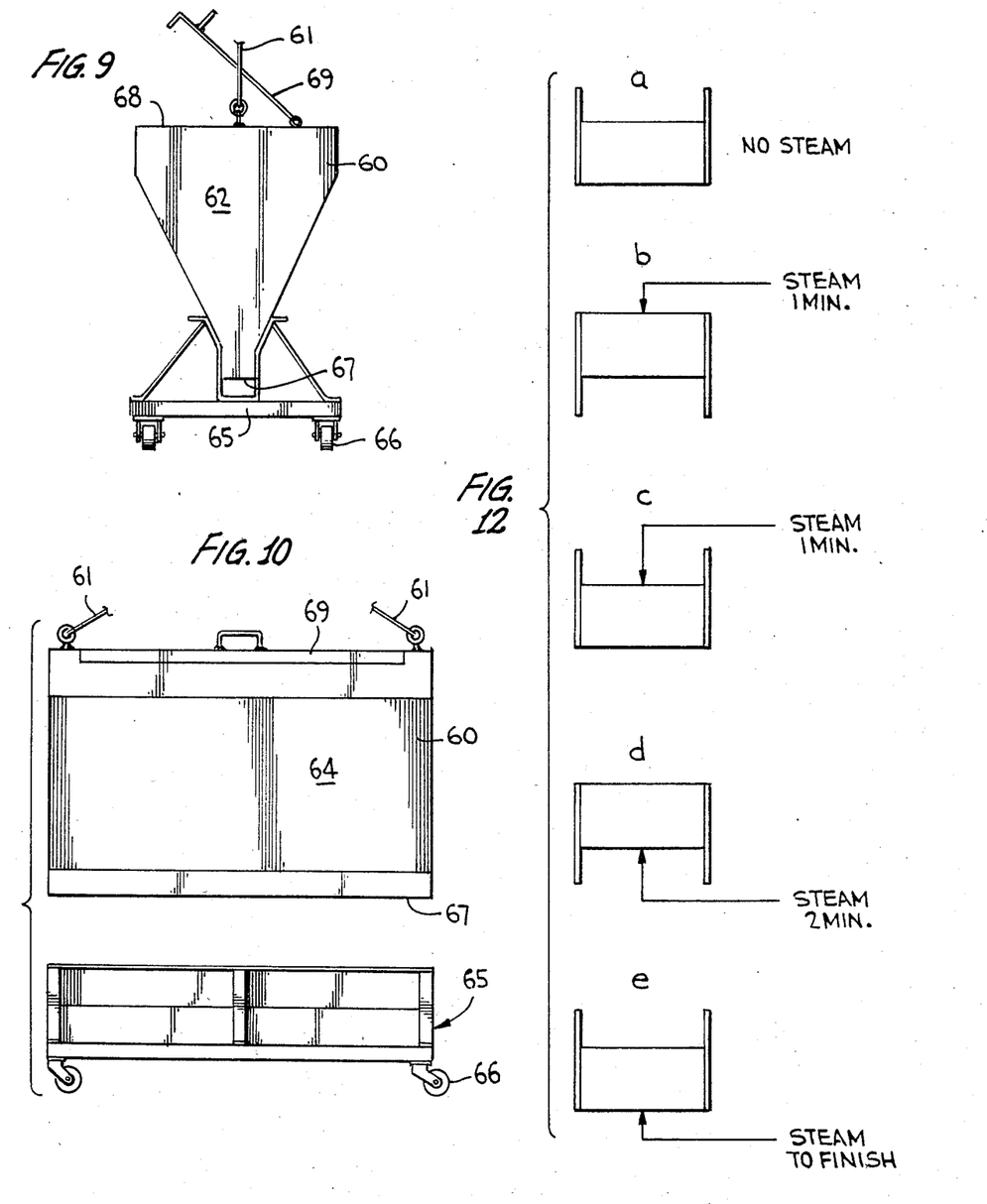
FIG. 9 is an end view of the apparatus for dispensing solids into the blender.
FIG. 10 is a side view of the apparatus for dispensing solids into the blender as shown in FIG. 9 separated from its dolly.
FIG. 12 diagrammatically illustrates the curing steps of the method of the present invention.

In the curing operation the foam-forming mixture is first cured with steam for a predetermined amount of time, i.e., one minute, from the bottom in the inverted position, step b as illustrated in FIG. 12 of the drawing; and then the steaming is discontinued. The mold is flipped top side up, and a second steaming operation is carried out for a predetermined amount of time, i.e., one minute as shown in step c of FIG. 12. The steaming is again discontinued and the mold again flipped bottom side up, followed by a third curing for a predetermined amount of time, i.e., two minutes as shown in step d of FIG. 12. The curing is discontinued and the mold is again flipped top side up into a final position, and steaming is continued for a predetermined amount of time, i.e., approximately four minutes as shown in step e of FIG. 12, to provide a final cure. The flipping of the mold in accordance with the claimed process provides uniform curing and, more critically, a foam bun which has a uniform density gradient from top to bottom. The characteristics of the resultant foam bun can be controlled by varying the time of the cure in a particular step. The longer or shorter the cure in a particular step controls the depth of setting up of the foam in that particular step. As is apparent, the flipping operation can be varied from the sequence shown in FIG. 12 to increase or decrease the number of flipping operations according to the criticality of controlling the density in the resultant bun. As will be apparent, it is possible to continuously rotate the mold while steaming. This can be accomplished utilizing molds having a round outer shell, with the shape of the foam bun being controlled within the shell by using inter-molds of the desired configuration. As a practical matter, however, the flipping operation as illustrated in FIG. 12 provides excellent control of the density characteristics of the foam and is more cost efficient from the standpoint of mold construction and energy consumption.

Figure 2:
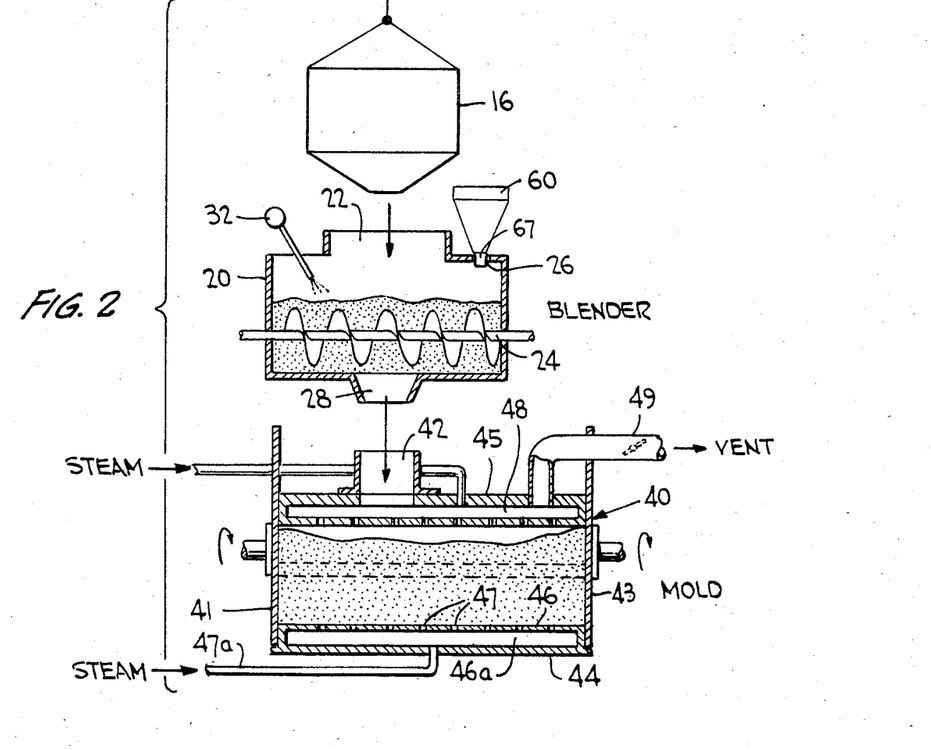
FIG. 2 is a diagrammatic view showing essential components of the plant system used according to the disclosed process.

FIG. 2 illustrates diagrammatically and in partial cross-section the essential components of the apparatus utilized in performing the method of the claimed invention. Particulate foam is dispensed into blender 20 from weighing station 16 through entrance port 22. Solid material is finely divided form is distributed onto the foam particles from solid material dispenser 60 through port 26 of blender 20 to blend with the foam particles. Dispenser 60, as shown more fully in FIGS. 9 and 10, comprises end walls 62 and side walls 64. The dispenser is mated to a dolly 65 which is on wheels 66. The dispenser is filled through the top 68 by removing the cover 69. The dispenser, as seen from FIG. 2, is designed to mate with an opening 26 in blender 20 when lifted to the top of the blender using a machine hoist or the like attached to chain means 61. The design permits the gradual release of the solid material, distributed in the dispenser in layers, through opening 67 in the bottom of the dispenser.

The particulate foam blended with the solid materials, while being rotated within the blender, is sprayed with a polyurethane foam-forming formulation through sprayers 32 from spray unit 30. Preferably a plurality of sprayers are arranged along the side or top of the blender. The sprayer is preferably an air sprayer having adjusting valves which will control the supply of atomized air entering a mixing chamber within the sprayer where the air and pre-polymer mix are blended and thoroughly mixed. The air/pre-polymer blend is projected uniformly onto the rotating foam particles. Air sprayers are preferred in the present process in that it is possible to include in the sprayed pre-polymer mix solid materials such as boric acid. An airless sprayer having fine spray holes are subject to clogging by any solids within the sprayed mixture. Sprayers which can be utilized are available in the art. One such sprayer is the DeVilbiss automatic gun sprayer manufactured by The DeVilbiss Company, Toledo, Ohio 43692. It is possible, however, to utilize other sprayers for injecting the pre-polymer mix, including airless sprayers.

Figure 3:
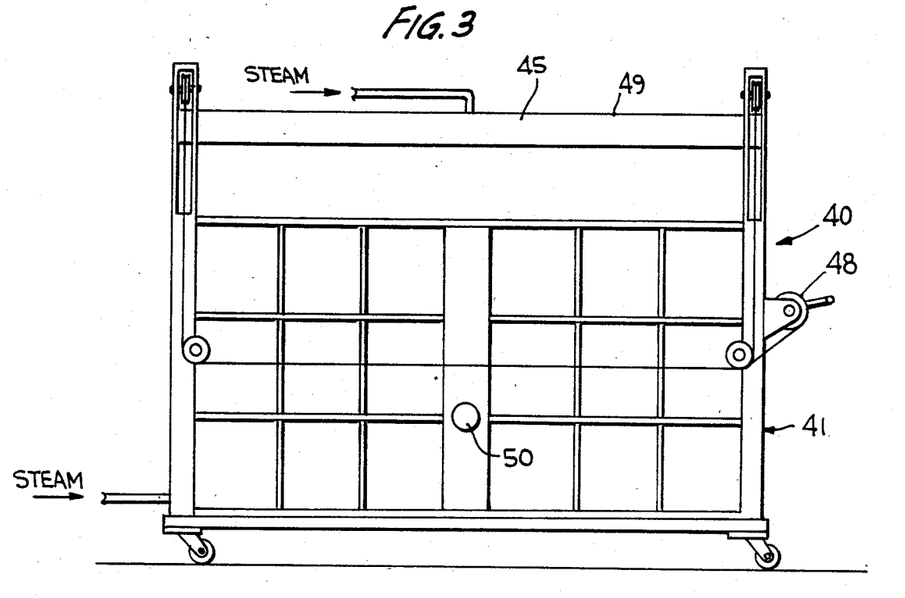
FIG. 3 is a side view of the molding apparatus used in accordance with the present invention.
Figure 4:
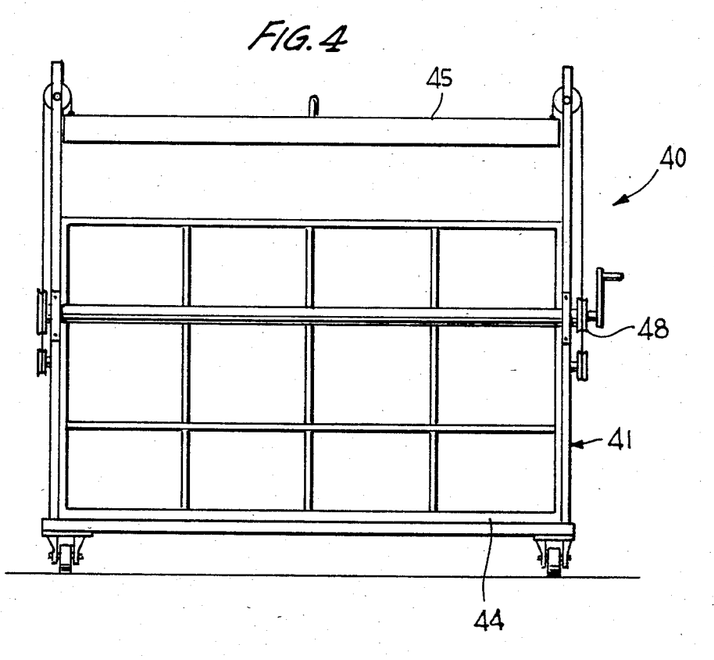
FIG. 4 is an end view of the mold used in accordance with the present invention.
Figure 8:
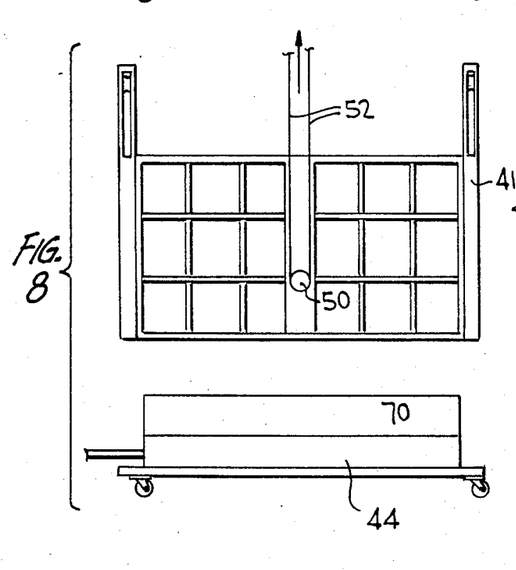
FIG. 8 is a side view of the mold with the top part of the mold separated from the lower part of the mold, showing the formed foam slab or bun.

After being thoroughly blended with the rotating auger 24, the blended mixture is dispensed through port 28 into mold 40 through entrance port 42. Mold 40, as shown in FIG. 2, includes a bottom mold portion 44 having a top wall portion 46 having therein a plurality of steam holes 47. Bottom mold portion 44 together with top wall portion 46 provide a steam chamber 46a. The mold further includes a top portion 41 designed to removably mate with bottom portion 44. The top portion includes side walls 43 and a top cover portion 45. The top cover portion 45, in addition to the entrance port 42, includes a steam chamber 48 and vent means 49. As best illustrated in FIG. 8, top portion 41 is removable from the bottom mold portion 44. As is also apparent, cover portion 45 is movably positioned within the mold in order to permit its adjustment up and down to provide a compressing force upon the foam mixture within the mold. The position of the top cover at a particular height permits the manufacture of foams having varying densities. The particulate foam received from blender 20 is distributed on the top wall 46 of bottom mold portion 44 and within top portion 41 as illustrated. Curing steam enters steam port 47a, flows through apertures 47 in contact with the foam, and is vented through vent 49. FIGS. 3 and 4 which are, respectively, a side view and an end view of the mold which is positioned on wheels show, inter alia, the mechanism 48 for raising and lowering cover portion 45.

Figure 5:
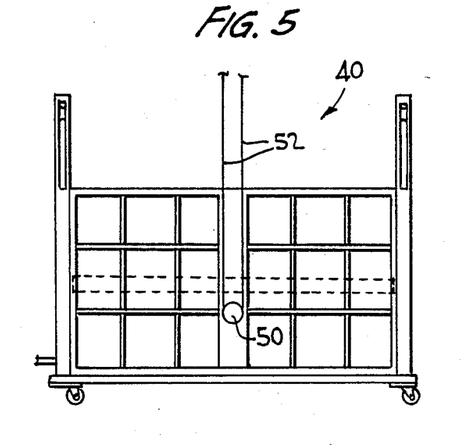
FIG. 5 is a side view of the mold in a first, upright position.
Figure 6:
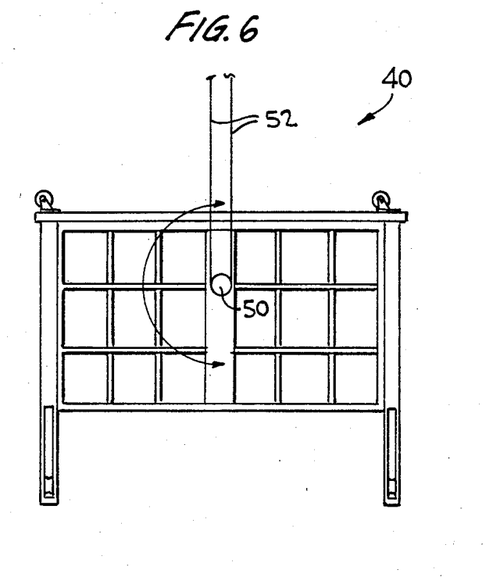
FIG. 6 is an end view of the mold in a second, inverted position.
Figure 7:
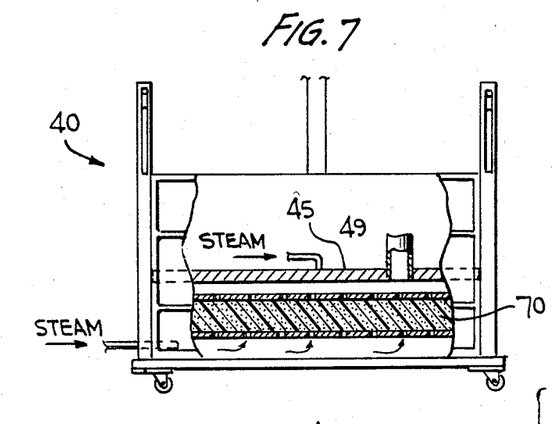
FIG. 7 is a side view of the mold partially cutaway to show the relationship of the mold parts and foam slab during curing.

FIG. 5 illustrates a side view of the molding apparatus in a first steaming position. As shown in FIG. 5, mold 40 has an adjustable pivot point 50 which is the center of gravity of mold 40 which, by cable means 52 attached to the pivot point 50, permits the convenient mechanical flipping of the mold. FIG. 6 illustrates the mold in the flipped or top to bottom position for further steaming. FIG. 7 illustrates the mold with cover 45 of the mold lowered to compress and control the height of the final bun 70. FIG. 8 in an exploded view of the top portion of the mold and the bottom of the mold with bun 70 in between.

Figure 11:
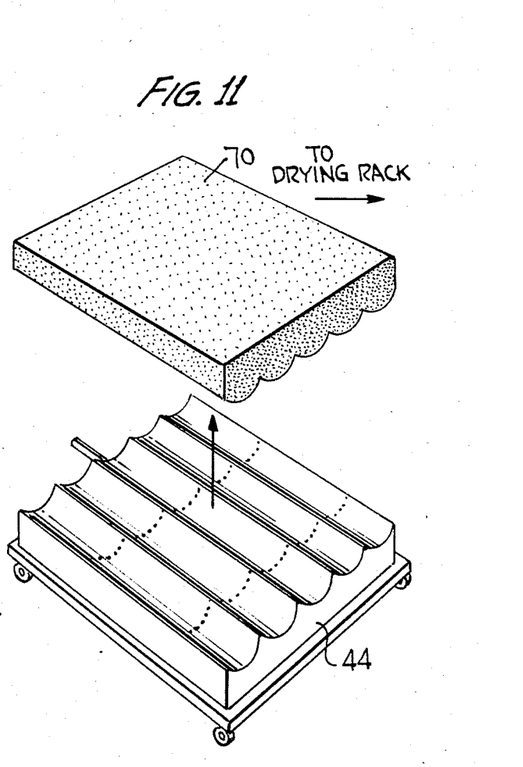
FIG. 11 is a perspective view showing the bottom portion of the mold and the formed polyurethane foam bun or slab separated from the mold.

FIG. 11 shows an exploded view illustrating bun 70 as it is being separated and removed from bottom mold portion 44. The bottom of the mold 44, as illustrated, is configured so as to provide a shaped bottom to the foam slab. The foam slab can be cut longitudinally with respect to the shape to provide five separate sections having a flat bottom and a curved top portion. These five sections can be cut transversely to provide foam articles, configured for example for back cushions of foamed upholstered chairs. The foam bun after being removed from the mold is placed on a drying skid having perforations therein for the passage of air and moisture, and transferred to a drying rack for drying.

PRESENTLY PREFERRED EMBODIMENT

The presently preferred embodiment of producing foam buns according to the present invention is as follows: A polyether polyol having a molecular weight in the range of about 3000 to 6500 is mixed with toluene diisocyanate in a weight ratio of 68% polyol and 32% toluene diisocyanate. The mixture will preferably include minor amounts of a catalyst such as stannous octoate; a surfactant component, i.e., organo silicone compounds; and a tertiary amine catalyst, i.e., N-ethylmorpholine. To 48.6 parts of the above mixture is added while mixing 30.2 parts of Thermolin 101 flame retardant, 3.8 parts boric acid, 1.6 parts dye, and 15.8 parts methylene chloride solvent to form a pre-polymer mix. Additional foam-forming formulations which are particularly suitable for use according to the present invention are described in earlier-referred to U.S. Pat. Nos. 4,438,220 and 4,438,221, incorporated herein by reference.

The pre-polymer mix is charged to sprayer unit 30 and heated with heater means 18. Foam chips having an average particle size of 7/16ths of an inch and which are primarily polyurethane polyether chips are charged in an amount of 100 parts to blender 20. Solid materials which are to impart combustion retardant characteristics to the foam comprising 123 parts aluminum hydrate, 8 parts antimony oxide, and 18.5 decca-bromo diphenyl oxide are mixed with the foam chips while being rotated in blender 20. The solid materials are dispensed into the blender over approximately a five-minute period. This causes the solid materials to spread out evenly and become uniformly blended with the foam chips. While rotating the mixture of foam chips and solids, 76.8 parts of the above-prepared pre-polymer mix are sprayed onto the solid chips and solid materials. The pre-polymer is sprayed at a rate of approximately 10-pounds per minute using six spray heads over a period of approximately fifteen minutes, followed by one minute of blending. After the final blending, the mixture is charged to mold 40, with the chips being distributed to provide a slightly increased height of chips at the edges of the mold. The cover of mold 45 is lowered to a height of 18 inches above the floor 46 of the mold. Steam is caused to flow from steam port 47a, through apertures 47, to contact the particulate mixture within the mold. Referring to the curing sequence of FIG. 12, the first steaming is for a period of one minute, at a steaming temperature of approximately 180° F. Steaming is discontinued, and the mold is flipped over as shown in FIG. 6. Steaming is again commenced and continued for one minute. Steaming is again discontinued, the mold flipped, and steaming commenced and continued for two minutes. The mold is again flipped for a final cure of four minutes to provide a finished foam. After the mold is allowed to rest, the mold is opened, cover 45 raised, and the top portion 41 separated from mold bottom portion 44. The finished bun 70 is removed and stored for drying.

A unique feature of the disclosed invention as previously indicated is the ability to utilize high ratios of solid particles within the foam while maintaining the structural integrity of the foam. As disclosed in the aforesaid U.S. Pat. No. 4,438,221, for each 100 parts of foam chips it is possible to incorporate up to about 200 parts by weight of solid material when utilizing from 30 to 75 parts by weight of the foam-forming formulation. It has been further determined, however, that the method provides additional advantages. It has been determined, for example, that certain combustion retardant materials such as boric acid are particularly effective as char-forming agents when mixed with the pre-polymer mix and sprayed onto the foam particles. Apparently the prepolymer encapsulates the boric acid particles and prevents the boric acid from being leached during the curing step. It has been found that the boric acid can be advantageously used in a range of from about 0.5 to 40% by weight and preferably from about 0.5 to 10% by weight based on the total weight of the foam bun. Below 0.5%, no effect is noted on the charring. Above about 10% the boric acid tends to crystallize out. However, by careful control and with select formulations up to about 40% by weight can be added. It is critical that when the amount of boric acid is increased that the pre-polymer be used in an amount sufficient to coat or encapsulate the boric acid particles. It is essential to break up the particles of boric acid so that they can be uniformly blended and encapsulated with the pre-polymer.

In addition to adding boric acid to the foam-forming formulation, it is possible to include other liquid and solid materials to provide varying characteristics to the foam bun obtained. Thus, it has been found that solid materials can be incorporated into a pre-foam mix in an amount of from about 0.5 to 40% based on the weight of the foam without detriment. When using air sprayers, it is possible to spray the pre-mix, including the solids, without plugging of the spray heads. By incorporating the solids into the foam it is possible to obtain improved antistatic characteristics of the foam. It is also possible to provide a fragrance to the foam or the like.

As will be apparent to one skilled in the art, various modifications can be made within the scope of the aforesaid description. For example, as above disclosed the foam particles are rotated within a blender. However, as will be apparent, "rotating" as used herein can be accomplished in various ways such as rotating within a blender using an auger as disclosed in the drawing, tumbling in any suitable manner to provide mixing, stirring with a paddle, and the like as long as a substantially uniform mixture is obtained. Such modifications being within the ability of one skilled in the art form a part of the present invention and are embraced by the appended claims.

It is claimed:

1. An improved method of forming a foam-filled polyurethane foam bun comprising the steps of
   (1) rotating particles of flexible polyurethane foam;
   (2) dispensing onto said rotating foam particles a finely divided solid material so as to provide a uniform mixture of said foam particles and said finely divided solid material;
   (3) uniformly applying a liquid, flexible polyurethane foam-forming material containing a reactive polyol and a polyisocyanate to said mixture of foam particles and solid material to provide a blend of foam particles and solid material in contact with said foam-forming material; and
   (4) distributing said blend into a mold and foaming and curing said foam-forming material by a sequence of steaming steps as follows:
      (a) steaming from a first position of said mold;
      (b) discontinuing steaming;
      (c) flipping said mold;
      (d) steaming from a second position;
      (e) discontinuing said steaming, and
      (f) repeating the flipping of said mold and steaming at least once to effect a final foaming and curing.

2. The method of claim 1 wherein said steaming steps (a), (d), and (f) are each for a duration of from about 0.5 to 3 minutes.

3. The method of claim 1 wherein said sequence of steaming steps are as follows:
   (a) steaming from a first position of said mold for from about 0.5 to 3 minutes;
   (b) discontinuing steaming and flipping said mold;
   (c) steaming from a second position of said mold for from about 0.5 to 3 minutes;
   (d) discontinuing steaming and flipping said mold;
   (e) steaming for a period of from about 1 to 4 minutes;
   (f) discontinuing steaming and flipping said mold; and
   (g) steaming to effect a final curing.

4. The method of claim 1 wherein said blend of step (3) is distributed in said mold to provide a greater depth of said blend at select areas of said mold to provide after foaming and curing a greater foam density in said select areas.

5. The method of claim 3 wherein said blend of step (3) is distributed in said mold to provide a greater depth of said blend at select areas of said mold to provide after foaming and curing a greater foam density in said select areas.

6. The method of claim 5 wherein said greater depth of said blend is at the edges of said mold to provide after foaming and curing a foam bun having a greater foam density and hardness at said edges.

7. The method of claim 5 wherein said greater depth of said blend is at the center of said mold to provide after foaming and curing a foam bun having a greater foam density and hardness at said center.

8. The method of claim 1 wherein said liquid flexible polyurethane foam-forming material has dispersed therein from about 0.5 to 40% by weight of said foam particles of a solid.

9. The method of claim 8 wherein said solid material is boric acid.

10. The method of claim 9 wherein said boric acid is present in an amount from about 0.5 to 10% by weight of said foam particles.

11. The method of claim 1 wherein for each 100 parts by weight of polyurethane foam particles there are used about 40 to 200 parts by weight of solid material and about 30 to 75 parts by weight of foam-forming material.

12. The method of claim 11 wherein said solid materials include combustion retardant materials.

13. An improved plant system for forming a foam-filled polyurethane foam bun comprising an apparatus for providing foam particles in a predetermined amount; a blender for receiving and rotating said foam particles, said blender including means for receiving a solid particulate material onto said rotating mixture; spray means for applying uniformly a polymer mix to said foam particles and solid material to form a blend; and mold means for receiving said blend from said blender and foaming curing said received blend, said mold including means for flipping said mold from a first to a second foaming and curing position and means for steaming said blend within said mold in each of said first and second foaming and curing positions.

14. The plant system of claim 13 wherein said spray means includes a plurality of air sprayers.

15. The plant system of claim 14 wherein said means for steaming includes a steam chamber at each of the top and bottom of said mold.

* * * * *

UNITED STATES PATENT AND TRADEMARK OFFICE
CERTIFICATE OF CORRECTION

PATENT NO. : 4,591,469

DATED : May 27, 1986

INVENTOR(S) : Michael S. Buchanan et al

It is certified that error appears in the above-identified patent and that said Letters Patent is hereby corrected as shown below:

In the title [54], "FOAM-IN-FORM" should read --FOAM-IN-FOAM--;

Column 1, line 1, "FOAM-IN-FORM" should read --FOAM-IN-FOAM--; and

Column 4, line 68, "is" should read --in--.

Signed and Sealed this

First Day of September, 1987

Attest:

DONALD J. QUIGG

Attesting Officer

Commissioner of Patents and Trademarks